United States Patent [19]
Franklin et al.

[11] Patent Number: 6,017,413
[45] Date of Patent: Jan. 25, 2000

[54] METHOD AND APPARATUS FOR HONEYCOMB CORE SPLICING

[75] Inventors: Alonzo W. Franklin, Wichita, Kans.; Timothy M. O'Neill, Seattle, Wash.

[73] Assignee: The Boeing Company, Seattle, Wash.

[21] Appl. No.: 08/948,305

[22] Filed: Oct. 9, 1997

Related U.S. Application Data

[60] Provisional application No. 60/027,562, Oct. 9, 1996.

[51] Int. Cl.[7] .................................................. B29C 65/00
[52] U.S. Cl. .................................. 156/304.2; 156/304.3; 156/304.5; 156/304.6; 156/157; 156/197; 156/306.6; 156/306.9; 428/58; 428/116; 428/118; 428/317.1
[58] Field of Search .............................. 156/304.2, 304.3, 156/304.6, 197, 306.6, 306.9, 157, 304.5; 428/58, 116, 118, 317.1

[56] References Cited

U.S. PATENT DOCUMENTS

| | | | |
|---|---|---|---|
| 2,860,740 | 11/1958 | Holland et al. | 156/197 |
| 3,301,732 | 1/1967 | Kunz | 156/304.5 |
| 3,520,763 | 7/1970 | Holland | 156/304.3 |
| 5,132,171 | 7/1992 | Yoshizawa et al. | 428/317.1 |
| 5,443,884 | 8/1995 | Lusignea et al. | 156/197 |
| 5,685,936 | 11/1997 | Komine et al. | 156/197 |

*Primary Examiner*—Deborah Jones
*Assistant Examiner*—Robert R. Koehler
*Attorney, Agent, or Firm*—Lawrence W. Nelson

[57] ABSTRACT

A method for forming a durable spliced sheet by splicing a plurality of components. Each component has a splicing edge and a core. The method comprises the steps of applying an adhesive, including graphite or fiberglass fibers, to the splicing edge of each of the components, aligning the splicing edge of each of the components with a respective contiguous counterpart, such that nodes of the core of each of the components match nodes on the contiguous counterpart, fastening the nodes of each of the components to the nodes of the aligned contiguous counterpart component, applying a uniform compressive pressure along the splicing edge, and heating the plurality of components to cure the adhesive and form the durable spliced sheet.

14 Claims, 5 Drawing Sheets

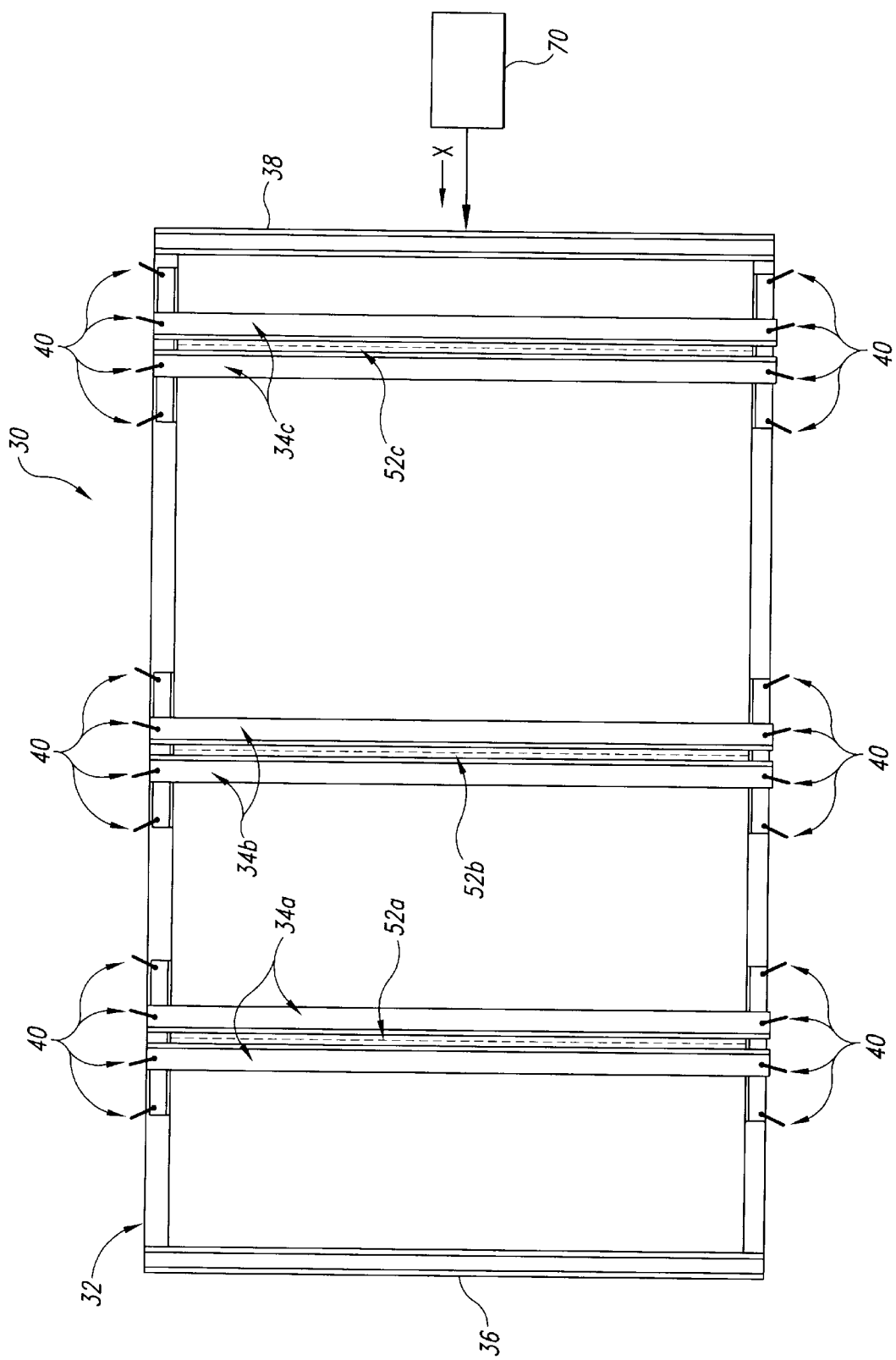

ved by the addition of fibers, a more viscous adhesive is created, this allows a slightly thicker bond line to form which accommodates a greater variation between the bonding surfaces. Another advantage to the modified adhesive is that it is inherently stronger, and it creates a stronger bond.

METHOD AND APPARATUS FOR HONEYCOMB CORE SPLICING

This application claims the benefit of priority to U.S. Provisional Patent Application No. 60/027,562 filed on Oct. 9, 1996.

BACKGROUND OF THE INVENTION

1. Field of the Invention

The present invention relates to the splicing of material into a sheet, and more particularly to an apparatus and method for splicing material having a honeycomb core to produce a panel.

2. Background Information

In many industrial applications, lesser or remnant pieces of a material are spliced to produce a larger component made of that same material. The need for splicing occurs when the material being used has a limited stock size or when remnant pieces recovered from an end-user manufacturing process are recycled. The structural requirements of spliced materials vary substantially with the application in which they are used; however, spliced materials are generally recognized as adequate if they possess the same strength and properties as un-spliced bulk material. Unfortunately, core splices are often found to be inadequate for end-user manufacturing.

Honeycomb core can be found in many applications. For example, honeycomb cores are used in interior aircraft panels, as well as padding devices design to absorb impact. Typically, a honeycomb core sheet 20, such as shown in FIGS. 1A and 1B, is spliced by coating a first core piece 24 with an adhesive along splice line 22. The adhesive is usually similar to that used to initially bond each of the cells at their nodes. The cells of a second core piece 26 are aligned with the cells of the first core piece 24, and then the two pieces 24 and 26 are pushed into contact with each other. As shown in FIGS. 1A and 1B, paper clips 28 are used to attach the nodes along the splice line 22. Then, the whole core sheet 20 is cured as required by the particular adhesive. However, the honeycomb core sheet 20, when spliced in such a manner, often exhibits splitting along the splice line 22 when an end-user attempts to form it to some prescribed contour. The splitting of the core sheet 20 usually renders it unfit for use.

For the foregoing reasons, there is a need for a honeycomb splicing process, as well as an apparatus to carry out the process, that produces a splice durable enough to withstand the forces exerted on a honeycomb sheet when it is contoured.

SUMMARY OF THE INVENTION

According to one aspect, the present invention relates to a method for forming a durable spliced sheet by splicing a plurality of components, each component having a splicing edge and a core, the method comprises the steps of applying an adhesive, which includes either graphite or fiberglass fibers, to the splicing edge of at least one of the components, aligning the splicing edge of each of the components with a respective contiguous counterpart, fastening the nodes of each of the components to the nodes of the aligned contiguous counterpart component, applying a substantially uniform compressive pressure along the splicing edge, and heating the plurality of components to cure the adhesive and form the durable spliced sheet

BRIEF DESCRIPTION OF THE DRAWINGS

FIG. 2 shows a top view of a fixture used in the splicing of honeycomb core sheets;

DESCRIPTION OF A PREFERRED EMBODIMENT

Figure 1A:
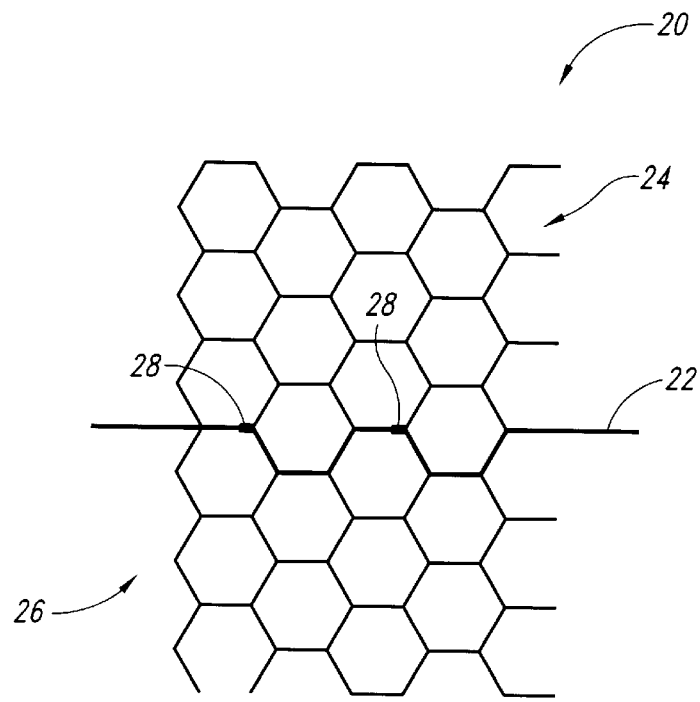
FIGS. 1A and 1B show a top view and side view, respectively, of a spliced honeycomb core sheet.
Figure 1B:
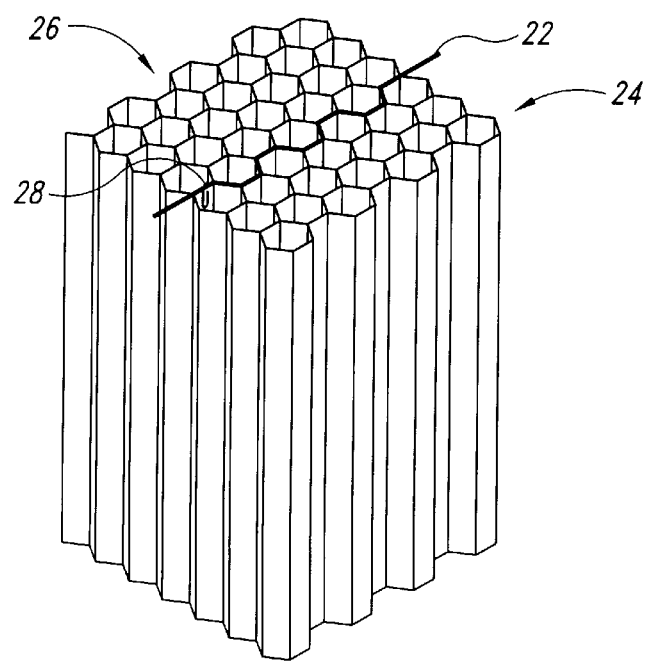

FIG. 2 shows a splicing fixture 30 used to form a durable and reliable splice along straight lines between a plurality of honeycomb core pieces. The fixture 30 includes a flat surface 32 upon which the core pieces are placed, straight members 34A, 34B, and 34C each extending width-wise across the fixture 30 to hold the core pieces firmly against the surface 32. The fixture 30 also includes a fixed bar 36, contiguous with the flat surface 32, and positioned width-wise at one end of the fixture 30, as well as an end-adjustable bar 38 positioned width-wise across the fixture 30 at an opposite end of the fixed bar 36. Finally, large and small C-clamps 40 are positioned along the fixture 30 to secure the positions of the straight members 34A, 34B, and 34C.

Figure 3:
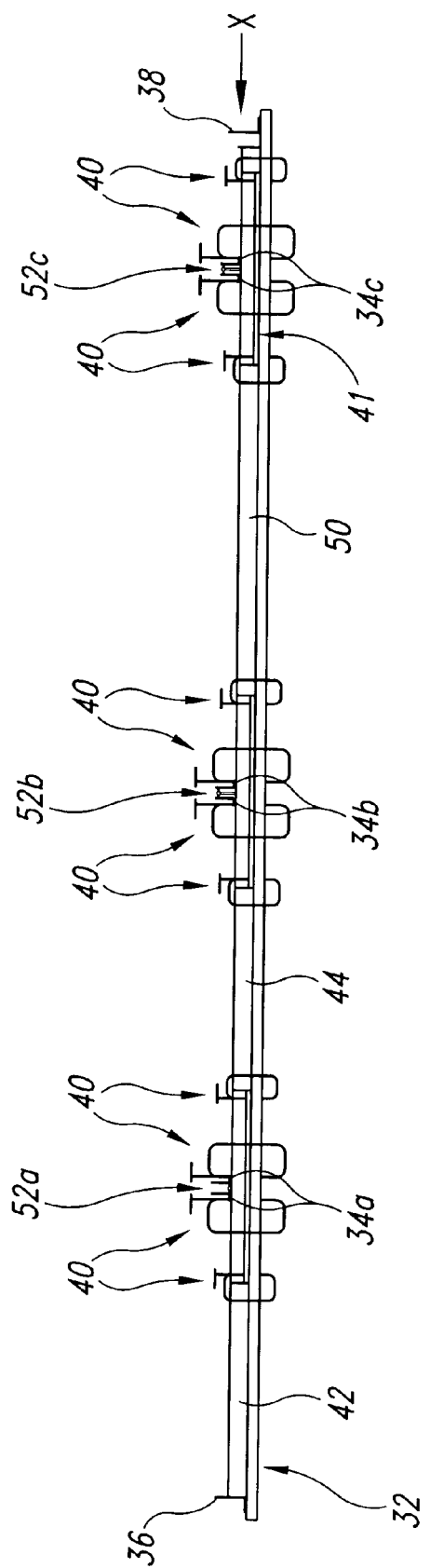
FIG. 3 shows a side view of the fixture used in the splicing of the honeycomb core sheets.

In a preferred embodiment of a method for producing a durable honeycomb core sheet, a non-bond film 41 is placed on the surface 32 at each point a splice will be attempted, as shown in FIG. 3.

Next, a specially tailored adhesive is prepared for application to splicing edges of the core pieces, which are preferably a graphite composite honeycomb core (HEXCEL HFT-GP) (BMS 8-339, Gr. 5.4), or a corrugated fiberglass honeycomb core (HEXCEL HRP-C) (Boeing materiel specification-Bms 8-124, Cl 1, Ty 3, Gr 4.5, St C). The tailored adhesive includes a polyimide node adhesive solution, and can be the same adhesive as used to originally bond the honeycomb cores. Preferably the node adhesive is either HEXCEL B-600 or HEXCEL 899-55, which is mostly comprised of n-methylpyrrolidone. The node adhesive is thoroughly mixed with a controlled amount of short, dry graphite or fiberglass fibers. Preferably, these graphite fibers are obtained by chopping a carbon fiber mat, such as Thornel Carbon Fiber Mat, Grade VMP½, into fiber strands between 0.01 and 0.1 inches in length. Preferably the amount of the graphite or fiberglass fibers added should be approximately 10% by weight of the tailored adhesive. The percentage by weight varies depending on the choice of adhesive, core, etc. By modifying the adhesive with the addition of fibers, a more viscous adhesive is created, this allows a slightly thicker bond line to form which accommodates a greater variation between the bonding surfaces. Another advantage to the modified adhesive is that it is inherently stronger, and it creates a stronger bond.

Figure 4A:
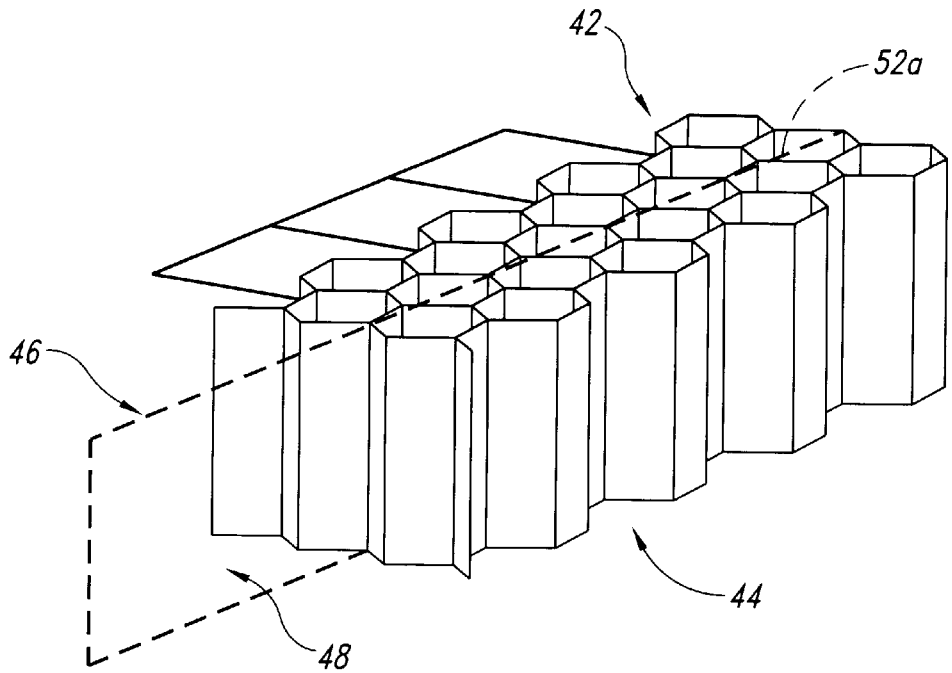
FIG. 4A shows a perspective view of a splice between two honeycomb core sheets.
Figure 4B:
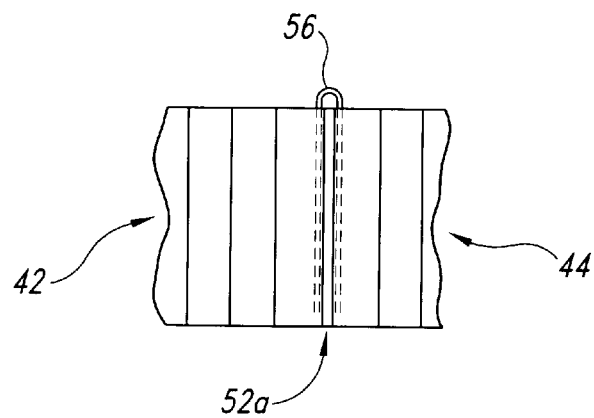
FIG. 4B shows a front view of the splice between the two honeycomb core sheets.

After the tailored adhesive has been mixed, a paint brush, tongue depressor, or other utensil, such as a roller, etc., is used to apply it to at least one of a first core piece 42 and a second core piece 44 along the edges 46 and 48, respectively along splice line 52A, 52B and 52C, as shown in FIGS. 4A and 4B. The first honeycomb core piece 42, as shown in FIGS. 3 and 4A, is place on the flat surface 32 of the fixture 30 with an edge abutted against the fixed end bar 36. The second honeycomb core piece 44, is then placed on the flat surface 32 adjacent to the first honeycomb core piece 42.

The first honeycomb core piece 42 and the second honeycomb core piece 44 are positioned in such a manner that edges 46 and 48, as shown in FIG. 4A, are aligned so that each individual cell node 48 is properly spaced. Preferably, the core pieces 42 and 44 are oriented on the flat surface 32 so that one of the core pieces 42 and 44 has a prepreg side facing the splice line 52A while the other of the core pieces 42 and 44 has a mat side facing the splice line 52A.

As shown in FIG. 4B, a fastening device 56, such as a small clamp, paper clips, preferably cotter pins, are attached to the nodes along the splice line 52A to maintain alignment of the first core piece 42 with the second core piece 44. Preferably, the fastening devices 56 are initially placed at the center of the splice line 52A and then work to its edges. All nodes must be properly aligned, and every node should have a fastening device 56.

Figure 5A:
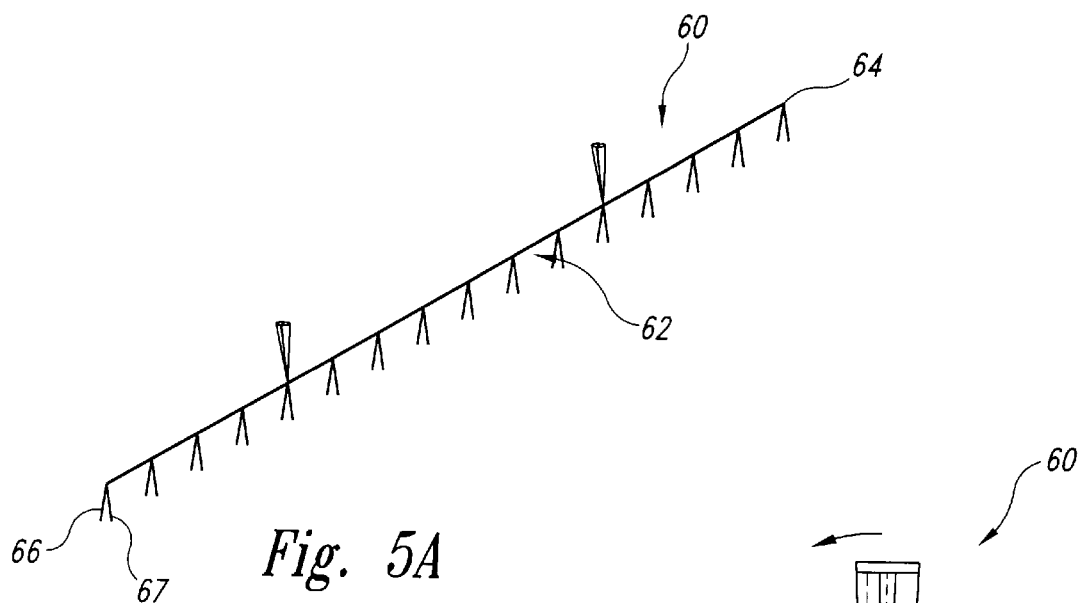
FIG. 5A shows a perspective view of a honeycomb core splice clamp.
Figure 5B:
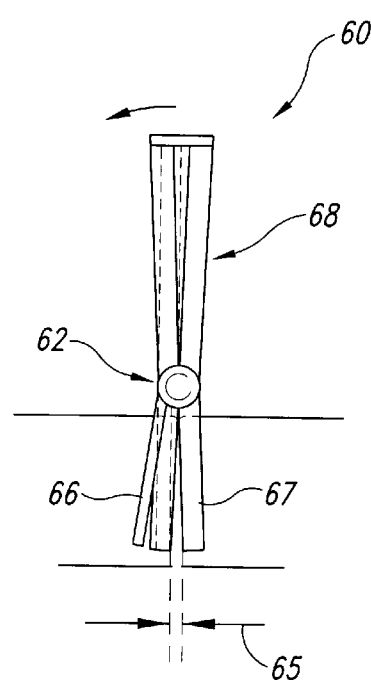
FIG. 5B shows a front view of the honeycomb core splice clamp.
Figure 5C:
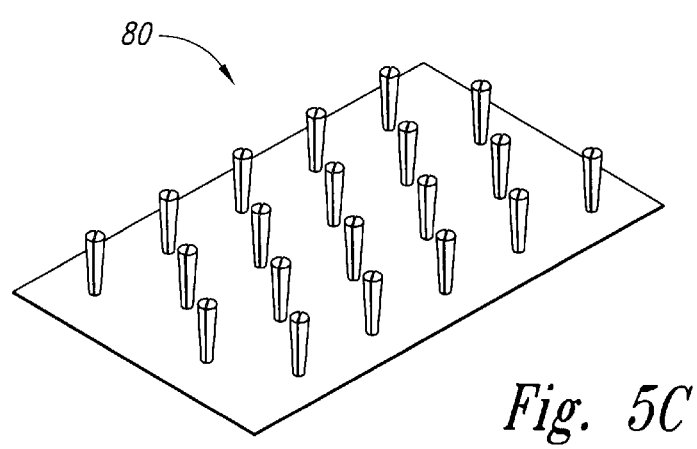
FIG. 5C shows a perspective view of a honeycomb core alignment array.

In an alternative embodiment, the fastening devices 56 are replaced by a core splice clamp 60 shown in FIGS. 5A and 5B. The core splice clamp 60 includes a series of miniature clamps 62 coupled to a member 64. Each of the miniature clamps 62 has two tines 66 and 67 separated by a gap 65 which can be adjusted using a spring and extensions 68, as is well known in the art. The splice clamp 60 allows the core pieces 42 and 44 to be quickly clamped and unclamped, and reduces the number of individual pieces that need to be accounted for to accomplish the process.

In another alternate embodiment, the fastening device 56 is replaced by an array of pins 80 used to ensure coincidental alignment of cells along the splicing edges of any two components. The array of pins 80 serve to ensure alignment only, having no function in applying compression force across the splice. In this embodiment the desired compression force across the splice, desirable in its capacity to establish a more intimate and stronger bond, is applied by compressing the external edges of the contiguous sheet.

Next, as shown in FIG. 3, a third piece of honeycomb core 50, is similarly placed and located on the fixture 30. The adjustable bar 38 is then positioned at the non-spliced end of the last piece of the honeycomb core, in this case, the third honeycomb core piece 50. Then, a force along the direction X, as shown in FIGS. 2 and 3, is applied to the end bar 38 providing a uniform compressive force across splice lines 52A–C, in a direction perpendicular to the splice lines. In a preferred embodiment, a source of regulated pressure 70, shown in FIG. 2, provides a substantially uniform compression force over the length of the end adjustable bar 38 as well as each of the splice lines 52A–C. The source of pressure 70 could be driven mechanically, pneumatically, or hydraulically and controlled actuators or flexible membranes could provide the necessary restraints and forces.

Prior to applying the compression force, the C-clamps 40 are used to secure the position of the end bar 38, to maintain the compressive force. Also, the straight member 34A, 34B, and 34C are positioned on either side of each of the splice lines 52A–C along their entire length to ensure that the respective pieces 42, 44, and 50 are co-planar, and to prevent core step-off in the thickness direction. As with the end bar 38, the C-clamps 40 are used to secure the locations of the straight members 34A, 34B, and 34C.

Finally, weights are placed along the splice and on the core pieces to hold the assembly flat, and the fixture 30 is heated to cure the adhesive. Preferably the adhesive should be cured by heating it above 300° F. for two hours and then cooling it at 200° F. for 30 minutes before allowing to cool to room temperature.

The synergistic effect achieved by utilizing the above procedure allows two or more pieces of honeycomb core material, or other core materials such as metallic core and non-hexagonal cores (such as flex cores) to be spliced to form a durable sheet capable of maintaining integrity even when subjected to stresses and strains required to shape the sheet While the detailed description above has been expressed in terms of specific examples, those skilled in the art will appreciate that many other configurations could be used to accomplish the purpose of the disclosed inventive apparatus and process. Accordingly, it will be appreciated that various equivalent modifications of the above-described embodiments may be made without departing from the spirit and scope of the invention. Therefore, the invention is to be limited only by the following claim.

What is claimed is:

1. A method for forming a durable spliced sheet by splicing a plurality of components, each component having a splicing edge and a core, said method comprising the steps of:

applying an adhesive including fibers to the splicing edge of at least one of the components;

aligning the splicing edge of each of the components with a respective contiguous counterpart one of said components;

fastening nodes of each of the components to nodes of said aligned one of said counterpart components;

applying a substantially uniform compressive pressure along the splicing edge; and heating the plurality of components to cure the adhesive and form the durable spliced sheet.

2. The method of claim 1 wherein said fibers are graphite fibers.

3. The method of claim 2 wherein said graphite fibers are 10 percent by weight of said adhesive.

4. The method of claim 1 wherein said fibers are fiberglass fibers.

5. The method of claim 1 wherein said step of fastening nodes includes a step of attaching cotter pins to each of said nodes along the splicing edge.

6. The method of claim 1 wherein said step of heating the plurality of components includes steps of:

heating said components above 300° F. for at least two hours;

cooling said components at 200° F. for at least 30 minutes; and cooling said components at room temperature.

7. The method of claim 1 wherein said adhesive comprises n-methylpyrrolidone.

8. The method of claim 2 wherein said graphite fibers vary in length from 0.01 inches to 0.1 inches.

9. A durable spliced sheet comprising:

a plurality of corrugated fiberglass honeycomb core pieces, each of said honeycomb core pieces including:
a prepreg side;
a mat side; and
a plurality of individual cell nodes, wherein said prepreg side of a first of said corrugated fiberglass honeycomb core pieces is aligned to said mat side of a second of said corrugated fiberglass honeycomb core pieces such that said cell nodes of said first of said honeycomb core pieces is aligned with said corresponding nodes of said second of said corrugated fiberglass honeycomb core pieces; and a tailored adhesive positioned between said first of said corrugated fiberglass honeycomb core pieces and said second of said corrugated fiberglass honeycomb core pieces, wherein said tailored adhesive includes n-methylpyrrolidone mixed with fiberglass fibers 10% by weight of the tailored adhesive.

10. A method for forming a durable spliced sheet, having a length, width, and thickness, from a first corrugated fiberglass honeycomb core piece and a second corrugated fiberglass honeycomb core piece using a splicing fixture having a base, a plurality of straight holding members, a fixed bar, and a movable bar, said method comprising the steps of:

applying an adhesive including n-methylpyrrolidone and fiberglass fibers to a first splicing edge of said first core piece;

positioning the first core piece on the second core piece on the base of the splicing fixture, such that the first core piece is adjacent to the fixed bar;

aligning the first splicing edge of a first core piece and a second splicing edge of the second core piece;

holding the first core piece and the second core piece against the base along the first splicing edge and the second splicing edge using one of the straight holding members positioned over the width of the spliced sheet;

applying a compressive pressure along the first and the second splicing edge by applying a force to the second core piece by moving the movable bar along the length of the spliced sheet; and heating the first core piece and the second core piece to cure the tailored adhesive.

11. The method according to claim 10 further comprising the step of:

fastening corresponding nodes of the first core piece and the second core piece with a core splice clamp.

12. The method according to claim 10, said step of heating further comprises the step of:

heating the first core piece and the second core piece above 300° F. for 2 hours.

13. A method for forming a durable spliced sheet having a length, width, and thickness, from a first corrugated graphite honeycomb core piece and a second corrugated graphite honeycomb core piece using a splicing fixture having a base, a plurality of straight holding members, a fixed bar, and a movable bar, said method comprising the steps of:

applying an adhesive including n-methylpyrrolidone and graphite fibers to a first splicing edge of said first core piece;

positioning the first core piece and the second core piece on the base of the splicing fixture, such that the first core piece is adjacent to the fixed bar;

aligning the first splicing edge of a first core piece and a second splicing edge of the second core piece;

holding the first core piece and the second core piece against the base along the first splicing edge and the second splicing edge using one of the straight holding members positioned over the width of the spliced sheet;

applying a compressive pressure along the first and the second splicing edge by applying a force to the second core piece by moving the movable bar along the length of the spliced sheet; and heating the first core piece and the second core piece to cure the tailored adhesive.

14. The method according to claim 13 wherein said step of applying adhesive further includes the step of:

cutting the graphite fibers to a length of from 0.01 inches to 0.1 inches.

* * * * *